April 21, 1964   C. C. MOORE, JR   3,129,732
IRREGULAR CURVE CUTTING SAW AND EDGER
Filed March 10, 1961   3 Sheets-Sheet 1

Clay C. Moore, Jr.
INVENTOR.

April 21, 1964  C. C. MOORE, JR  3,129,732
IRREGULAR CURVE CUTTING SAW AND EDGER
Filed March 10, 1961  3 Sheets-Sheet 2

Clay C. Moore, Jr.
INVENTOR.

April 21, 1964
C. C. MOORE, JR
3,129,732
IRREGULAR CURVE CUTTING SAW AND EDGER
Filed March 10, 1961
3 Sheets-Sheet 3
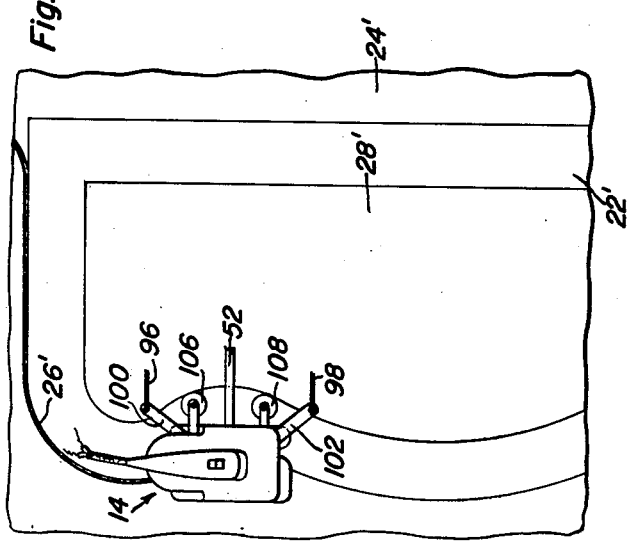
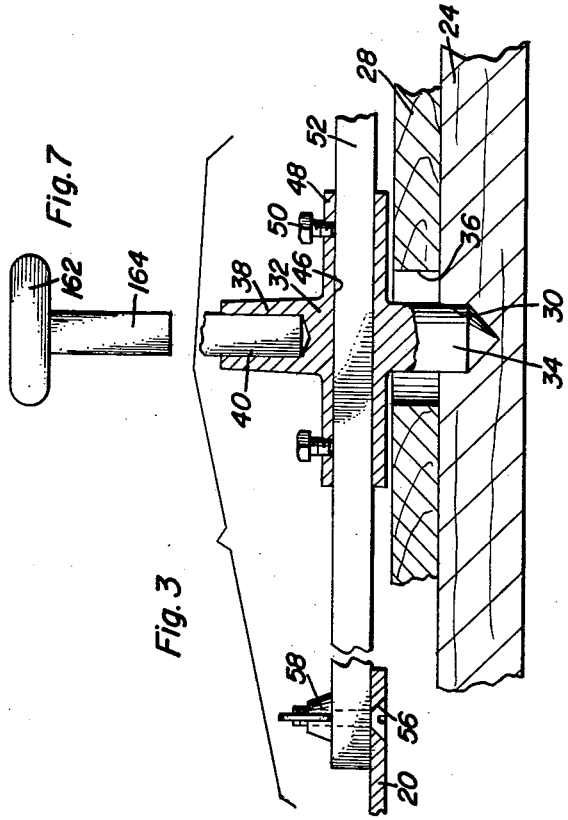
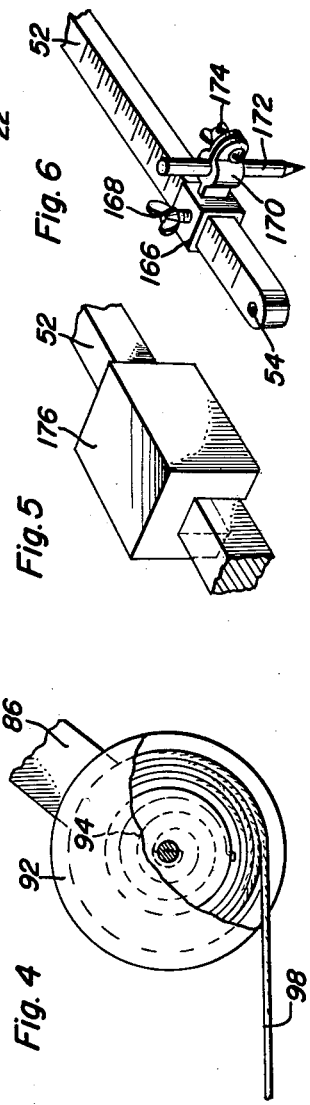
Clay C. Moore, Jr.
INVENTOR.

United States Patent Office 3,129,732
Patented Apr. 21, 1964

3,129,732
IRREGULAR CURVE CUTTING SAW AND EDGER
Clay C. Moore, Jr., 1904 N. Water St.,
Corpus Christi, Tex.
Filed Mar. 10, 1961, Ser. No. 94,881
7 Claims. (Cl. 143—76)

The present invention generally relates to a device for cutting irregular curves or regular curves forming a circle whereby circular or other devices having irregular curves may be cut by using the present invention.

The primary object of the present invention is to provide a cutting device incorporating a saber saw and an attachment therefor which enables the saber saw to move in a desired path for cutting a desired shape from a sheet of material such as plywood, marble, metal or the like while the device is specifically disclosed in use with a saber saw, it also is effectively employed with hand routers, motors with special shaped stones or polishing heads thus forming various shaped edges or polishing an already formed edge depending upon the particular materials used and the cuts or edges formed.

Another object of the present invention is to provide a circle or irregular curve cutting device incorporating a saber saw and a mechanism supporting the saw for movement thereof in a desired path with the movement being guided by virtue of engagement of roller means carried by the saber saw with a guide template or the like.

Still another object of the present invention is to provide a saber saw attachment for cutting circles or irregular curves, which movement of the saw is automatic due to a counter-balancing assembly which causes rotation of the saber saw about its center of movement.

Still another object of the present invention is to provide a saber saw attachment for use of the saber saw in cutting circular members from polygonal panels such as wood, plywood, marble and the like in which movement of the saber saw is automatically accomplished.

Yet another important feature of the present invention is to provide a saber saw attachment which is simple in construction, adapted for many uses, capable of effectively guiding the saber saw during the movement thereof and generally inexpensive to manufacture.

These together with other objects and advantages which will become subsequently apparent reside in the details of construction and operation as more fully hereinafter described and claimed, referenec being had to the accompanying drawings forming a part hereof, wherein like numerals refer to like parts throughout, and in which:

FIGURE 3 is a detailed sectional view illustrating the center pivot mounting of the device;

FIGURE 4 is a view of the reel which supports the saber saw in position;

FIGURE 5 is a fragmentary perspective view illustrating further structural details of the invention;

FIGURE 6 is a perspective view illustrating a scriber mounted adjustably on the arm normally supporting the saw for scribing an arcuate, circular or irregular curve;

FIGURE 7 illustrates a removable handle for enabling manual operation of the device; and FIGURE 8 is a plan view illustrating the device cutting an irregular curved member.

Figure 1:
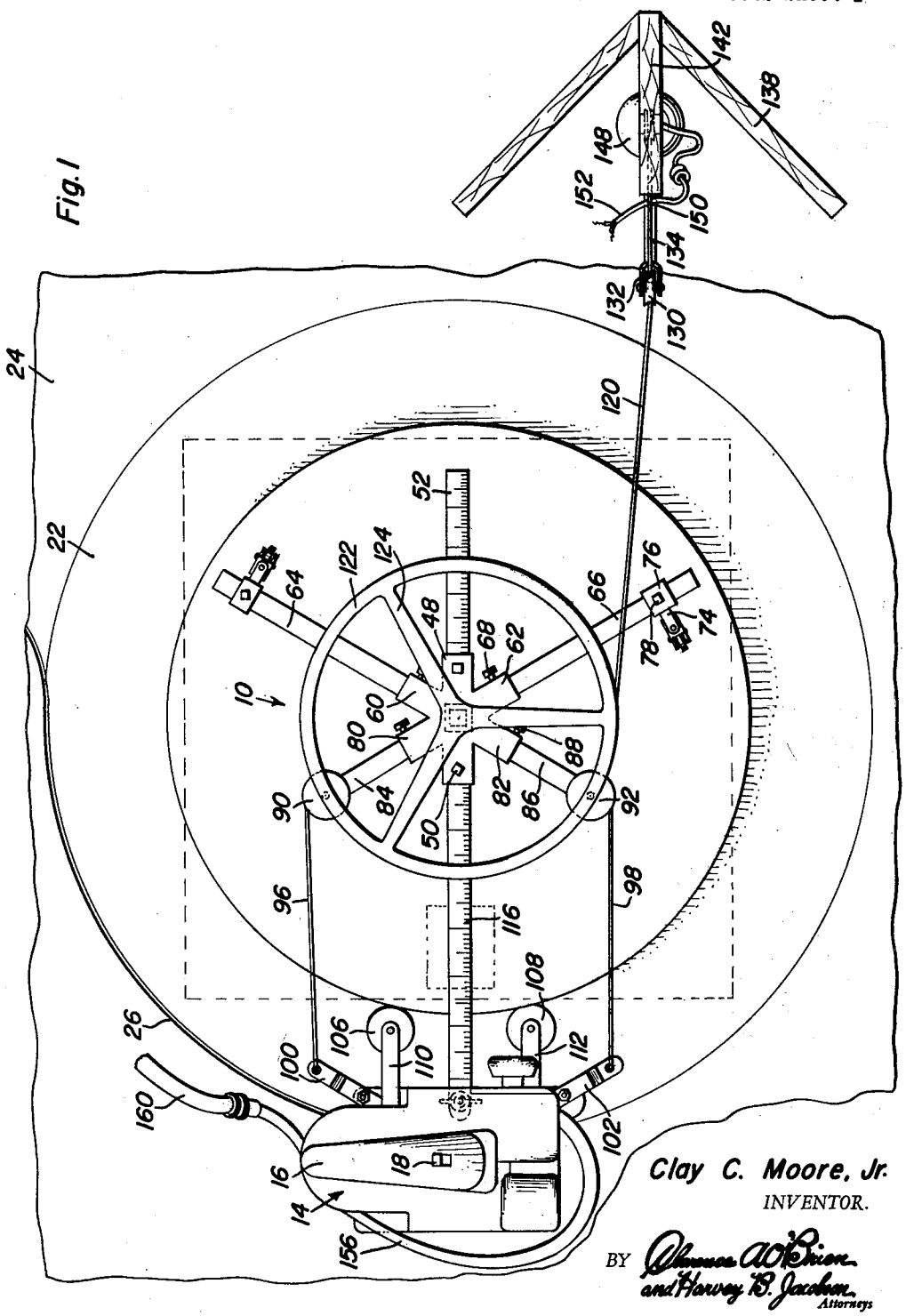
FIGURE 1 is a plan view of the present invention.
Figure 2:
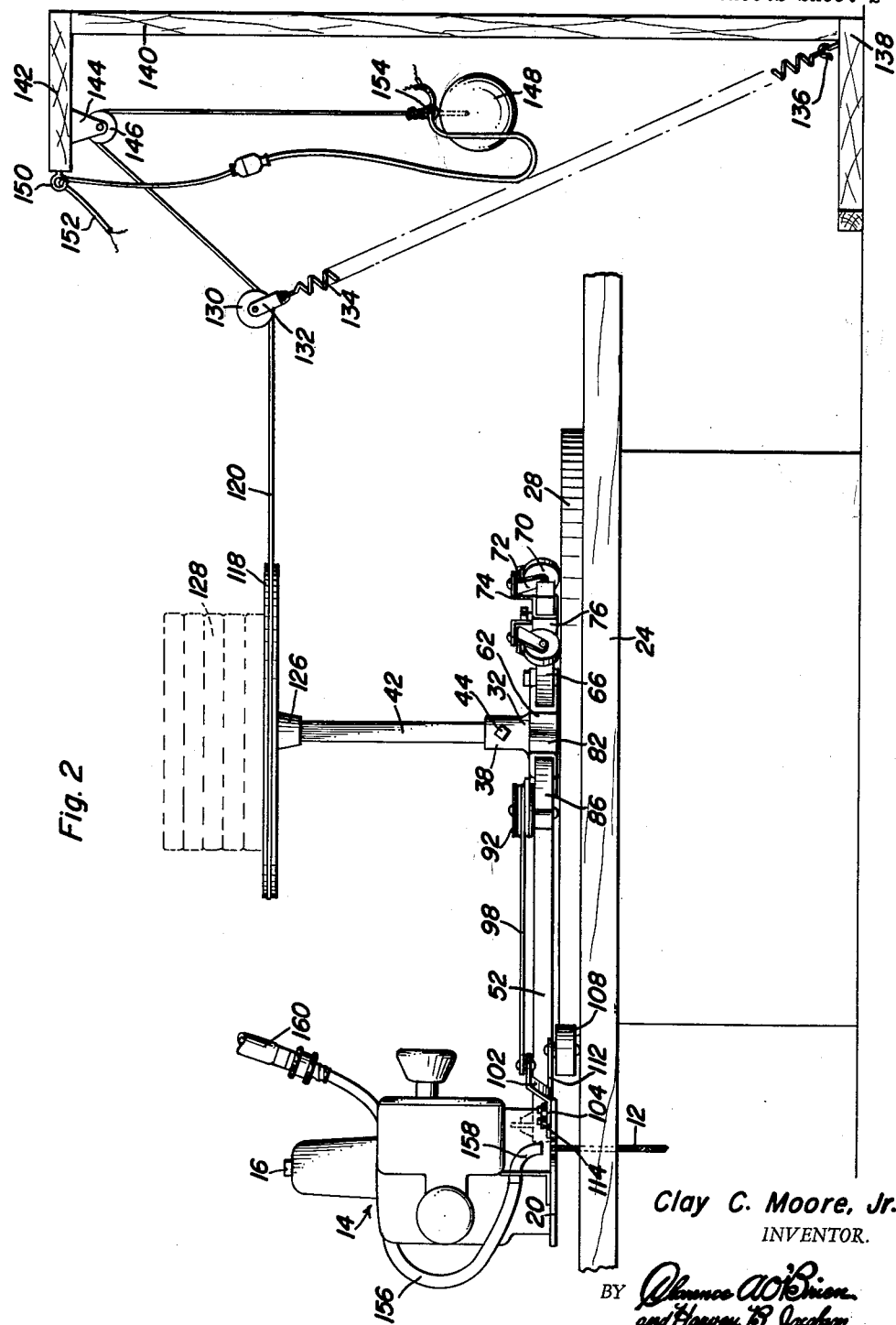
FIGURE 2 is a side elevational view of the construction of FIGURE 1.

Referring now specifically to the drawings, the numeral 10 generally designates the circle or irregular curve cutting saw of the present invention which employs a saber saw blade 12 reciprocated in the usual manner by a power mechanism generally designated by the numeral 14 and which may be any of several conventional saber saws and which usually include a handle 16 and a switch lever 18 for causing reciprocation of the saw blade 12. Normally, the saber saw 14 includes a bottom plate 20 which receives the saw blade 12 during reciprocation thereof.

The drawings illustrate the most complex form of the invention for use in cutting a circular piece of material 22 from a generally rectangular stock piece 24 by virtue of providing a curved cut 26 formed by moving the saw blade 12 in a circular path. The device is effective for use in sawing circular wood members such as plywood for use as table tops or the like and also is especially useful in cutting marble or other similar stone in which event a diamond saw blade is employed.

A circular template 28 is provided and rests against the top of the stock piece 24. If marble is being cut, the marble is orientated so that the normal rough or unfinished side faces upwardly. This is also true of plywood and the stock panel 24 is provided with a socket 30 formed therein which does not extend all of the way through the stock piece 24 but which forms a socket for rotatably positioning a central hub member 32 having a depending pointed stub shaft 34 rotatably received in the socket 30. The template 28 is provided with an opening 36 therein for enabling passage of the stub shaft 34. The top of the hub 32 is provided with an upwardly extending sleeve 38 that is provided with a hollow socket or bore 40 extending longitudinally therein for receiving a vertically elongated tubular member or shaft 42 detachably secured in position by a locking setscrew 44.

Extending transversely of the hub 32 is a horizontal bore 46 in which diametrically opposed hollow sleeves or projections 48 form a continuation of the bore 46 and the sleeves 48 each have a locking setscrew 50 associated with the top surface thereof for slidably receiving an elongated support arm 52 which is disposed generally in parallel relation to the template 28 and to the stock piece 24.

The end of the arm 52 is provided with an opening 54 receiving a fastening screw or bolt 56 which extends through the base plate 20 and a wing nut 58 is provided on the upper end of the bolt 56 for securing the arm or rod 52 to the saber saw assembly 14. The headed end of the fastener 56 is preferably countersunk into a smooth relation to the bottom surface of the base plate 20 of the saber saw and may conveniently be provided with a screwdriver receiving kerf.

The hub 32 is also provided with radially extending sleeves 60 and 62 in acute angular relation with the sleeve 48 remote from the saber saw. The sleeve 60 receives an arm 64 while the sleeve 62 receives an arm 66 and the arms 64 and 66 are secured in position by setscrews 68. The outer end of each of the arms 64 and 66 is supported from the surface of the template 28 by a castering roller 70 supported in a yoke 72 swivelly supported from bracket 74 carried by an adjustable sleeve 76 clamped in adjusted position on the respective arms 64 and 66 by a setscrew 78.

Also extending radially from the hub 32 is a pair of sleeves 80 and 82 in acute angular relation to the sleeve 48 disposed adjacent or nearest to the saber saw assembly 14. The sleeve 80 telescopically receives a support arm 84 while the sleeve 82 receives a similar arm 86. The arms 84 and 86 are held in place by setscrews 88 and the outer end of the arm 84 supports a reel or pulley 90 thereon while the outer end of the arm 86 supports a similar reel or pulley 92 thereon. The reels 90 and 92 are similar in structure with the details of one of the pulleys or reels 92 being illustrated in FIGURE 4 in which a spiral spring 94 is provided which rotationally biases the reel in one rotational direction. Connected to the reel 90 is a flexible line 96 while connected to the reel 92 is a similar flexible line 98 whereby the reels 90 and 92 tension the flexible lines 96 and 98 and continuously try to wind the flexible lines 96 and 98 onto the reels 90 and 92, respectively.

The outer ends of the flexible lines 96 and 98 are attached to brackets 100 and 102 respectively which are offset upwardly from but connected with the base plate 20 of the saber saw assembly 14 by virtue of fastening bolts 104 or the like. Thus, the reels 90 and 92 bias or urge the saber saw assembly 14 towards the center of rotation of the vertical shaft 42.

The saber saw assembly 14 is provided with follower means engaging the periphery of the template 28 in the form of a pair of rollers 106 and 108 carried by brackets 110 and 112 attached to the bottom plate 20 by any suitable fastening means such as by bolts 114. With this construction, the follower rollers 106 and 108 will follow the contour of the periphery of the template 28 and cause the corresponding movement of the saber saw assembly 14 thus duplicating the configuration of the template 28. It is pointed out that the follower rollers 106 and 108 are on opposite sides of the arm 52 which extends radially from the center of rotation of the cutting saw to generally the central portion of the saber saw assembly. Accordingly, movement of the saber saw assembly about the center of rotation defined by the socket 30 and the stub shaft 34 will effectively cause the saber saw to form a cut-out panel corresponding in shape to the periphery of the template 28.

For purposes of convenience, the support arm 52 is provided with graduated indicia 116 thereon which may be associated with the end of the sleeve 48 or any other suitable reference line whereby the radius of the cut of the saw blade may be determined or preset thus eliminating the necessity of the template. The saw assembly may be moved in a circular path by manual operation thereof or by an automatically operated means for rotating the shaft 42, hub 32, arm 52 and the saber saw assembly 14. The means for rotating the shaft 42 is in the form of an enlarged circular wheel 118 rigidly affixed to the upper end of the shaft 42 and having a grooved rim receiving a flexible line 120. The flexible line 120 is wound onto the rim 118 so that as the flexible line 120 is pulled, it will unwind from the wheel 118 thus causing the wheel 118 to rotate about the axis of the shaft 42. The wheel 118 is provided with a rim 122 and a plurality of radial spokes 124 joining at the center in a hub 126. The upper surface of the wheel 118 is smooth for receiving a plurality of weights 128 which may be employed for securely retaining the stub shaft 34 in the socket 30 during movement of the saber saw 14 in a circular path about the center.

The flexible line 120 extends under a pulley 130 supported by a yoke 132. The yoke 132 is connected to an elongated tension coil spring 134 having the other end attached to an eye member or hook member 136 at the bottom corner of a supporting structure 138. The supporting structure 138 includes an upright 140 and a horizontal member 142 supporting a pulley shackle or support 144. A pulley 146 is supported from the support 144 and the line 120 passes over the pulley 148 and then extends downwardly and is provided with a counterweight 148 thereon whereby the counterweight will cause the flexible line 120 to rotate the wheel 118 as the line 120 is pulled therefrom.

The horizontal member 142 is also provided with an eye bracket 150 receiving an electrical conductor 152 adapted to be connected with and drive the saber saw 14. Another portion of the conductor 152 goes through the attachment eye 154 of the counterweight 148 so that the conductor 152 will generally move in accordance with the position of the counterweight 148. This construction provides continuous bias on the wheel 118 in an endeavor to rotate the shaft 42 and thus cause the saber saw to move in a circular path for cutting a circular panel 22.

When cutting marble, the saber saw is provided with a water tube 156 having one end thereof terminating in a nozzle 158 directed toward the saw blade 12 for cooling and lubricating the saw blade during use. The tube 156 is connected with a hose 160 of any suitable construction for supplying water to the nozzle 158.

If the mechanism for automatically operating the saber saw is not employed, the shaft 42 may be removed from the socket 38 and a handle knob 162 having a depending polygonal shank 164 is mounted on the sleeve 38 whereby the hub 32 may be rotated manually by hand thus causing the saber saw to move in a circular path about the center of rotation defined by the stub shaft 34.

In FIGURE 6, the support arm 52 is provided with a sliding sleeve 166 mounted thereon with a setscrew 168 securing the sleeve 166 adjustably in position. The sleeve 166 is provided with a split clamp 170 thereon which receives a marker or scriber 172. The marker or scriber 172 is secured in place by a fastening assembly 174 and is employed to mark or scribe a particular pattern of movement of this portion of the arm during rotation of the hub for marking a circular line on an underlying piece of wood.

When the arm 52 is used as a marker, the saber saw is removed and also, the device is usually employed as a manual device when using it as a marker.

Also, the base plate or mounting plate 20 of the saber saw may be provided with additional openings to which a flexible cord or line may be attached for pulling the saw about its center of rotation in lieu of the enlarged grooved pulley or wheel 118. Electrical energy may be supplied to the saw in any suitable manner and if it is desired to limit the degree of cutting of the saw, stop means may be provided for so limiting the saw.

In checking the scribe mark made by the scriber assembly in FIGURE 6, a conventional beam compass may be employed and this is also true of checking the diameter of the circular panel cut from the workpiece.

The supporting arm 52 may be connected to the saber saw in any suitable manner. For example, some types of saber saws will enable the mounting bar to be connected directly to the handle without any modification of the handle whatsoever by using a suitable clamp. Additionally the weights may be mounted directly onto the mounting arm if desired in order to provide adequate downward pressure so that the stub shaft will be retained in the socket in the workpiece. When the device is used as a hand saw for manual operation, the weights are not necessary since the center may be held in place by virtue of the use of the handle knob 162 with downward pressure being exerted thereon. By removing the shaft 42, pulley 118 and associated mechanism and replacing the shaft 42 with the handle knob 162, a relatively simple manual saw construction is provided which will effectively employ the saw structure for cutting a circle. Also, when the hand arrangement is to be employed, all of the arms 64, 66, 84 and 86 are removed since they are not needed to stabilize the hub or pull the saw toward the template. Further, all weights and weight bars are removed when using the device manually.

While the various sleeves and arms have been illustrated as tubular square members in configuration, it is pointed out that such structures could just as well be circular in configuration or any suitable shape and size.

When the device is to be used as a manual handsaw, a small brace may be employed for extending between the mounting bar 52 and the base plate 20 to maintain the longitudinal axis of the saber saw generally in perpendicular relation to the radial line defined by the mounting bar 52. Also, a tow line may be attached to the mounting bar or to the saber saw base plate in any suitable manner for pulling the saber saw from any desirable counterbalance structure which will cause the saber saw to move in a circular path.

A weight bar may be mounted in overlying relation to the mounting bar 52 with the weight bar being connected thereto in any suitable manner and extending into overlying relation to the saber saw 14 and a plurality of weights may be mounted on the weight bar for effectively holding the saber saw down in position. With a tow line attached to the mounting bar or the saber saw itself, it is usually necessary to have several counterbalance mechanisms or have a movable counterbalance mechanism which renders the device substantially semi-automatic in operation rather than automatic whereby the device will move for a predetermined arc automatically and then stop. This is especially useful when cutting arcs across the ends of relatively narrow workpieces. This device is especially useful in cutting circular material such as plywood or marble and especially circular panels of relatively large diameter.

For purposes of demonstration, FIGURE 5 illustrates a weight 176 carried by the mounting bar 52 or a separate weight bar may be provided for carrying the weights 156 and the weight bar will be attached to the mounting bar 52. In FIGURE 8, there is illustrated a modified template 28' for cutting a panel 22' from a workpiece 24'. The saber saw 14 operates in the same manner but in this case, the mounting bar 52 is not rigidly attached to any central hub but may move in relation to the workpiece 24' as determined by the periphery of the template 28' for cutting a cut 26' conforming to the curvature of the periphery of the template 28'.

In the manually operated form of the invention, either the workpiece or the support for the counterbalance weight has to be moved peripherally about the panel being cut and there is also provided a safety supporting chain which limits the pivotal movement of the saw about its center thereby eliminating the possibility of the saw cutting into obstructions or the like and also assuring that the angle of pull on the saw will be the desired angle and will not tend to displace the saw radially. Also, the power supply for the saber saw may be incorporated into a pull chain on a socket with the pull chain connected to the weight whereby the pull chain will be pulled downwardly when the weight goes down below a certain position thus stopping the saw by shutting off the electrical supply thereby providing a safety arrangement for the saw.

In using the saw in cutting a circular panel from a piece of plywood, the procedure may be as follows, scribe a circle on the underside of the plyboard and mark the center point thereof. Drill a shallow hole part way through in the undersurface of the plyboard of the same diameter as the point 34 of the device. A small hole should then be drilled just a little beyond the outside of the desired circle and the point 34 is placed in the hole or socket 30 and the saw blade 12 is placed in the small hole outside of the circle. The saw is then operated and is gradually brought inwardly into the desired circle with the setscrews 50 holding the mounting bar 52 being loose. When the saw blade is in the desired circle, the setscrews may be tightened. In lieu of scribing the circle, the mounting bar 52 may be set so that the indicia thereon will indicate the radius of the circle to be cut thus requiring only the point 34 to be forced into the material or disposed in the socket provided therein. Marble also usually has a rough side and a smooth polished side and all work will be done from the rough side. With the marble supported on a suitable table or the like, the water hose is attached to the water connection and the ground wire is hooked to the saw. Normally, the operator will employ rubber apron, rubber boots, rubber gloves and goggles and the desired circle is inscribed and a hole drilled at the center thereof with a suitable concrete bit. The hole will be of the required depth and of the same size as the point 34. The sawing operation is then substantially the same as that in sawing plyboard except that the flow of water should be controlled and the necessary weights will be employed so that the saw moves steadily with no strain on the motor.

When using the device in contour sawing over irregular surfaces, additional weight will be required for pulling the saw over the high spots on the contours and more friction will be encountered throughout the working area of the saw. The device may be employed in conjunction with any material being cut including marble, wood, metal and provides a highly effective cutting device having many utilities and capable of being converted from manual to semi-automatic to automatic operation.

When the device is employed to cut metal, a hacksaw and an oil line are employed in lieu of the water line which is employed when cutting marble. This will eliminate the tendency of some metals to warp when subjected to the heat of a cutting torch normally employed for cutting circles or other curved patterns.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A saw for cutting a curved kerf comprising an elongated arm, a pointed member adjustably mounted on one end of said arm for engagement with the center of curvature of the kerf, a saw assembly mounted on the other end of said arm for movement about the center of the pointed member, said saw assembly including a reciprocating blade for forming a saw kerf, said pointed member being provided with an upwardly opening socket, a shaft detachably mounted and secured in the socket, an enlarged grooved pulley on the upper end of said shaft, and a tensioned flexible line attached to the grooved pulley and wound thereon whereby the tension line turns the shaft and the arm thereby moving the saw assembly about the center formed by the pointed member, weights disposed on the pulley for holding the pointed member in the socket, said pointed member being provided with a transverse sleeve adjustably receiving the arm, graduated indicia on said arm for indicating the radius of movement of the saw, radially extending sleeves rigid with the arm receiving sleeve on the pointed member, arms in each of said sleeve, and castering rollers carried by each of the arms for engaging a supporting surface for stabilizing the enlarged pulley and saw assembly, additional sleeves mounted on the transverse arm receiving sleeve, arms disposed in each of the additional sleeves, a spring loaded reel carried by each of the last mentioned arms, and a flexible line connected to each of the spring loaded reels and extending to and connecting to the saw assembly for biasing the saw assembly inwardly toward the center point, and a template encircling the pointed member, said saw assembly including roller followers disposed inwardly thereof engaging the periphery of the template for causing the same assembly to move in accordance with the configuration of the periphery of the template.

2. The structure as defined in claim 1 wherein said tensioned line extends over a supported pulley, and a weight on said line for maintaining the line under tension.

3. The structure as defined in claim 2 together with means for arresting movement of the saw and cutting off the power to the saw assembly after a predetermined movement thereof.

4. The structure as defined in claim 3 wherein said arm is provided with weight means carried thereby for holding the saw assembly against the workpiece.

5. A device for cutting a curved kerf comprising an elongated arm, mounting means on one end of said arm for rotatably and adjustably mounting said arm, a cutter assembly mounted on the other end of said arm for movement therewith, said mounting means including a pair of outwardly projecting arms in generally the same plane as said elongated arm, one arm of said pair of arms located in spaced relation on each side of said elongated arm, spring means carried by each arm of said pair of arms, said spring means extending to and connecting to said cutter assembly for biasing the cutter assembly inwardly toward the center of rotation, and a template encircling the center of rotation, said cutter assembly including follower means disposed inwardly thereof engaging the periphery of the template for causing the cutter assembly to move in accordance with the configuration of the periphery of the template, each of said spring means consisting of a spring loaded reel and a flexible line extending between and connecting the reel and cutter assembly, said mounting means including a vertically extending shaft coaxial with the center of rotation, an enlarged pulley on the upper end of said shaft, an elongated flexible line attached to and wound about said pulley whereby a pull on the line effects, through the shaft, a turning of the mounting means and cutter assembly, a support pulley located outward from the enlarged pulley, said line extending over said support pulley, and a weight on the outer end of said line for maintaining a constant pull thereon.

6. The device of claim 5 wherein said mounting means includes a second pair of arms diverging radially outward, said second pair of arms each having a roller thereon for engaging a supporting surface for stabilizing the device.

7. A device for cutting a curved kerf comprising an elongated arm, mounting means on one end of said arm for rotatably and adjustably mounting said arm, a cutter assembly mounted on the other end of said arm for movement therewith, said mounting means including a pair of outwardly projecting arms in generally the same plane as said elongated arm, one arm of said pair of arms located in spaced relation on each side of said elongated arm, spring means carried by each arm of said pair of arms, said spring means extending to and connecting to said cutter assembly for biasing the cutter assembly inwardly toward the center of rotation, and a template encircling the center of rotation, said cutter assembly including follower means disposed inwardly thereof engaging the periphery of the template for causing the cutter assembly to move in accordance with the configuration of the periphery of the template, said mounting means including a vertically extending shaft coaxial with the center of rotation, an enlarged pulley on the upper end of said shaft, an elongated flexible line attached to and wound about said pulley whereby a pull on the line effects, through the shaft, a turning of the mounting means and cutter assembly, a support pulley located outward from the enlarged pulley, said line extending over said support pulley, and a weight on the outer end of said line for maintaining a constant pull thereon.

References Cited in the file of this patent

UNITED STATES PATENTS

| Number | Name | Date |
|---|---|---|
| 902,656 | Heno et al. | Nov. 3, 1908 |
| 1,124,509 | Paolucci | Jan. 12, 1915 |
| 1,620,374 | Maloney | Mar. 8, 1927 |
| 1,639,039 | Knabbusch et al. | Aug. 16, 1927 |
| 1,741,082 | Thiel | Dec. 24, 1929 |
| 1,797,088 | Howard | Mar. 17, 1931 |
| 1,825,444 | Dietrich | Sept. 29, 1931 |
| 1,898,956 | Harvie | Feb. 21, 1933 |
| 1,988,565 | Owen | Jan. 22, 1935 |
| 2,119,353 | Reimer | May 31, 1938 |
| 2,394,789 | Lavoie | Feb. 12, 1946 |